United States Patent

[11] 3,575,266

[72] Inventor Amnon Sitchin
     Gainesville, Fla.
[21] Appl. No. 845,367
[22] Filed July 28, 1969
[45] Patented Apr. 20, 1971
[73] Assignee Ford Motor Company
     Dearborn, Mich.

[54] SELF-ADJUSTING PARKING BRAKE
     6 Claims, 2 Drawing Figs.
[52] U.S. Cl. .................................................. 188/106,
                                            188/78, 188/79.5
[51] Int. Cl. .................................................. F16d 65/22

[50] Field of Search .................................... 188/2 (D),
                                  78.35, 106 (A),(F), 79.5 (P),(GC)

[56] References Cited
     UNITED STATES PATENTS
     2,127,739  8/1938  La Brie .................... 188/106(A)

Primary Examiner—Duane A. Reger
Attorneys—John R. Faulkner and Roger E. Erickson ABSTRACT: A parking-brake-actuating linkage that is automatically adjustable in response to adjustment of the brakeshoes. A cable guide is mounted on one of the shoes near the adjusting screw and tightens the parking brake cable as the brakeshoes are adjusted outwardly.

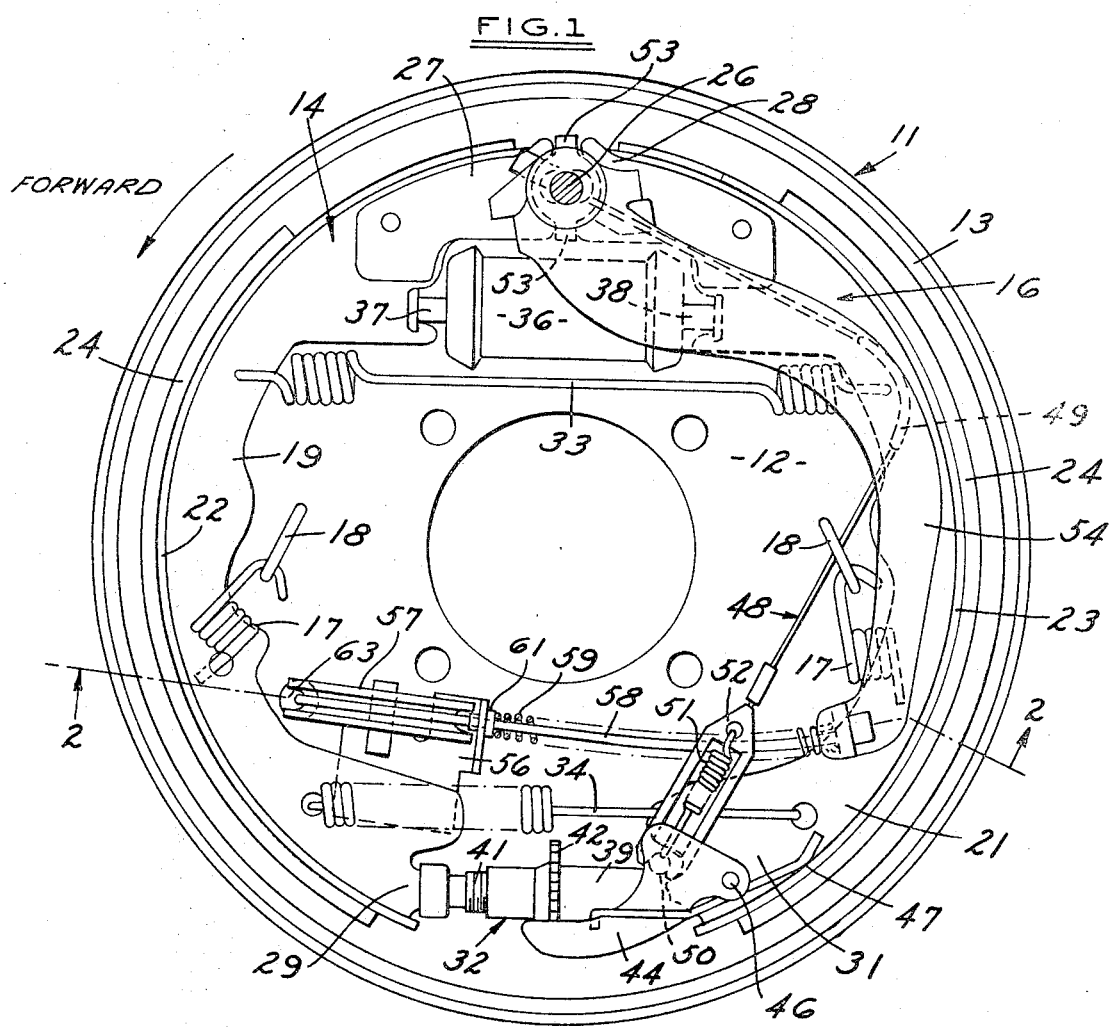
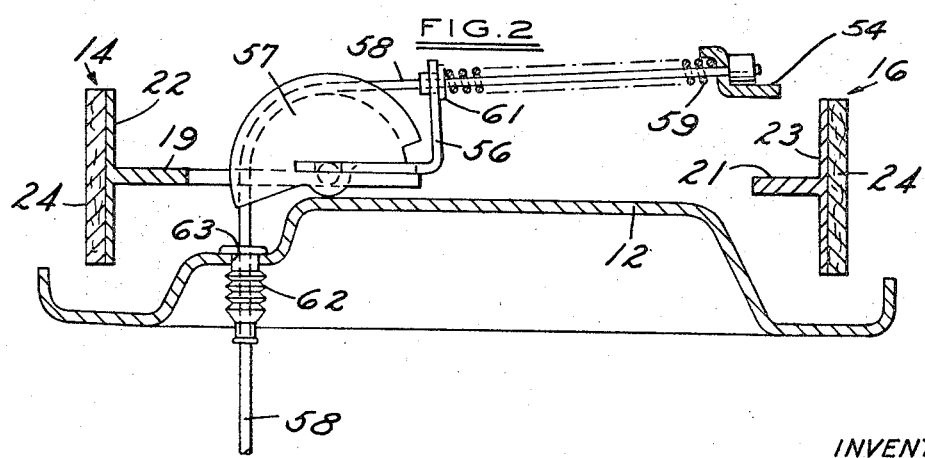
INVENTOR
AMNON SITCHIN
BY JOHN R. FAULKNER
ROGER E. ERICKSON
ATTORNEYS

SELF-ADJUSTING PARKING BRAKE

BACKGROUND OF THE INVENTION

Drum brake assemblies having automatically adjustable brakeshoes are well known in the prior art. However, manual adjustment is still commonly required to keep the parking-brake-actuating linkage in proper adjustment. Automatic adjustment of the parking brake linkage has been accomplished in some prior art devices in which mechanisms entirely separate from the service brakes function to periodically tighten the parking brake linkages. In contrast with the prior art, this invention provides a parking-brake-actuating mechanism which is an integral part of the service brake and is automatically adjustable in response to normal adjustment of the brakeshoes. The invention also provides an automatically adjustable parking-brake-actuating mechanism that is economical to produce, reliable in operation, and requires little or no maintenance.

BRIEF DESCRIPTION OF THE INVENTION

A brake assembly constructed in accordance with this invention includes a backing plate and a pair of arcuate brakeshoes. The shoes, movably connected to the backing plate, are engageable with an annular brake drum and include first and second adjacent ends. An anchor pin secured to the backing plate interposes the first adjacent ends. A shoe adjustment means interposes the second adjacent ends. A brake-actuating means engages each of the brakeshoes. A connecting means interconnects the actuating means and a control assembly external to the brake assembly. An opening is formed in the backing plate that receives a portion of the connecting means. A second portion of the connecting means, between the actuating means and the backing plate opening, engages a guide means mounted on one of the brakeshoes.

BRIEF DESCRIPTION OF THE DRAWINGS

FIG. 1 illustrates an outside elevational view of a drum brake assembly embodying the invention; and FIG. 2 is a cross-sectional view through line 2-2 of FIG. 1.

DETAILED DESCRIPTION OF A PREFERRED EMBODIMENT

FIG. 1 shows a left-rear brake assembly 11 which embodies the invention. The assembly includes a backing plate 12, mounted to the rear axle housing (not shown) of an automotive vehicle, and a brake drum 13 mounted to the wheel hub (not shown) and rotatable therewith. Primary and secondary brakeshoes 14 and 16, respectively, are movably mounted to the backing plate by means of holddown springs 27 and hooks 18. The brakeshoes include web portions 19 and 21 which extend from the arcuate portions 22 and 23, respectively, in a plane perpendicular to the axis of rotation of the drum. The radially outer surface of each shoe comprises a friction surface or brake lining 24 which is engageable with the radially inner surface of the brake drum 13. An anchor pin 26 is rigidly mounted to the backing plate and interposes the upper ends 27 and 28 of the brakeshoes. The lower ends 29 and 31 of the shoes are separated by an adjusting screw assembly 32. A pair of retraction springs 33 and 34 interconnect the primary and secondary brakeshoes urging them together and apart from the rotating brake drum. A hydraulically actuatable wheel cylinder 36 having a pair of movable piston links 37 and 38 engaging the upper portions of the brakeshoe webs 19 and 21 is mounted on the backing plate beneath the anchor pin 26. Upon depression of the brake pedal (not shown) and pressurization of the hydraulic system, the wheel cylinder forces the primary and secondary shoes apart and into engagement with the rotating brake drum to effect vehicle braking.

The adjustment screw assembly 32 includes a nut portion 39 which engages a threaded portion 41. The nut portion includes a star wheel 42 having a plurality of evenly spaced circumferential ratchet type teeth. A lever 44 is pivotally mounted to the lower end 31 of the secondary shoe by pin 46 and is biased into engagement with star wheel 42 by spring 47.

A self-adjustment cable assembly 48 extends from the anchor pin 26, about a guide 49 mounted on the secondary shoe 16, and to pin 50 of lever 44. The cable assembly includes a spring segment 51 attached to the lever 44. A cage 52 prevents the spring from being completely relieved of its tension.

Pivotally mounted to the anchor pin 26 are cam means 53 and parking brake lever 54. Movement of the lever away from the secondary brakeshoe 16 causes the cam means to spread the upper ends 27 and 28 of the shoes toward engagement with the brake drum 13. This provides a means for mechanical application of the vehicle brakes suitable for parking brake use.

A bracket 56, mounted to the lower end of the web of primary brakeshoe 14, pivotally supports a pulley sector 57. Parking brake cable 58, connected to the free end of lever arm 54, extends about the pulley sector and through an opening 63 in the backing plate 12. A compression spring 59 is positioned about the cable between the bracket 56 and the lever arm 54 and provides a force tending to separate the primary brakeshoe 14 and the lever arm. Plastic ferrule 61 protects the cable from wear at the bracket. Flexible boot 62 provides a dirt seal at the opening 63 in the backing plate.

OPERATION

FIG. 1 illustrates a drum brake assembly for the left-hand rear wheel of an automotive vehicle. The direction of rotation of the drum is counterclockwise when the vehicle is travelling in a forward direction. When the brakes are not applied, the brakeshoes 14 and 16 are held away from the rotating drum 13 by retraction springs 33 and 34. Pressurization of the wheel cylinder 36 forces the piston links 37 and 38 outwardly from the cylinder against the webs of the brakeshoes and causes the shoes to engage the rotating brake drum 13. As the primary shoe 14 engages the drum, its upper end is carried away from the anchor pin 26 by the friction forces between the lining and the brake drum. This force is transmitted through the adjusting screw mechanism 32 to the lower end of the secondary shoe 16. The upper end of the secondary shoe engages the anchor pin 26 which ultimately absorbs the frictional force.

The brake assembly is self-adjusting when the brake is applied as the vehicle is travelling in a reverse direction. The wraparound effect of the brake shoes is the reverse of that described in the previous paragraph. Accordingly, the upper end of the secondary shoe 16 becomes spaced from the anchor pin 26 while the upper end of the primary shoe 14 forcibly engages the pin. This wraparound or circumferential translation of the shoes causes the pivot pint 46 of the adjustment lever 44 to be displaced and the distance from the anchor pin 26 to the cable attachment point 50 on the adjusting lever to be increased. This increase causes the spring 51 to stretch and places the entire cable assembly 48 under increased tension. Accordingly, an increased clockwise moment is applied to the adjustment lever 44 and to the star wheel 42. If the brake linings 24 have experienced significant wear since the last advance of the star wheel, the increased force on the wheel cause by the increased tension of the adjustment cable 48 will rotate the star wheel and widen the separation between the lower ends of the shoes. Upon release of the brake, the lever will advance to the next successive tooth of the star wheel in a ratchetlike manner.

If the parking cable 58 were connected directly to the lever 54 from the opening 63 in the backing plate without passing over a cable guide member mounted to one of the brakeshoes, then the adjustment of the brakeshoes would not affect the tension of the parking brake cable. It has been found in prior art devices that as brake linings experienced wear, the lever travel required to apply the parking brake becomes greater in spite of the action of adjusting screw assembly 32. This invention provides for the positioning of a cable guide means or pulley segment 57 on the primary brakeshoe web 19 adjacent the adjusting screw assembly 42. The pulley segment 57 together with the primary shoe 14 function as a cable tightening device in that it increases the distance that the cable must span from the lever 54 to the opening 63. Consequently, it is not only the relative position of the shoes that is adjusted automatically by an advance of the star wheel 42, but also the tension of the parking brake cable 58.

The cable adjustment mechanism described above may be used with other common forms of parking brake lever mechanisms. For example, the mechanisms would work equally as well with the type of parking brake often used in passenger vehicles in which the parking brake lever is pivotally attached to the secondary brakeshoe and includes a link or strut that engages the primary brakeshoe.

This description describes a preferred embodiment of the invention. Modifications and alterations may occur to those skilled in the art which are included within the scope and the spirit of the invention.

I claim:

1. A brake assembly having a backing plate and a pair of arcuate brakeshoes movably connected to said backing plate and adapted to be engageable with an annular brake drum rotatably disposed relative to said brakeshoes;
   said shoes having first and second adjacent ends;
   anchor means secured to said backing plate interposing said first adjacent ends of said shoes;
   shoe adjustment means interposing said second adjacent ends extensible to incrementally separate said second ends;
   brake-actuating means engaging said shoes;
   connecting means interconnecting said actuating means and a control assembly external to said brake assembly,
   said actuating means engageable with said brakeshoes to spread said shoes into braking engagement with said brake drum in response to the control assembly;
   an opening in said backing plate receiving said connecting means;
   said connecting means between said actuating means and said backing plate opening engaging one of said brakeshoes.

2. A brake assembly according to claim 1 and including:
   said connecting means comprising a cable;
   guide means mounted to said one shoe and receiving a portion of said cable between said brake actuating means and said opening in said backing plate.

3. A brake assembly according to claim 2 and including:
   said brake actuating means comprising a lever means pivotally mounted to anchor pin;
   cam means secured to said lever and engaging said first adjacent ends of said brake shoes;
   said cam means spreading said first adjacent ends upon pivotal movement of said lever means.

4. A brake assembly having a backing plate and primary and secondary arcuate brakeshoes movably connected to said backing plate and adapted to be engageable with an annular brake drum rotatably disposed relative to said brakeshoes;
   said shoes having first and second adjacent ends;
   anchor means secured to said backing plate interposing said first adjacent ends of said shoes;
   shoe adjustment means interposing said second adjacent ends of said brakeshoes and being extensible to incrementally separate said second ends in response to wear of said brakeshoes;
   cam means pivotally mounted on said anchor pin engaging said first ends of said brakeshoes,
   lever means secured at one end to said cam means and extending toward said primary shoe;
   cable means attached to the other end of said lever means;
   an opening formed in said backing plate receiving said cable means;
   cable guide means mounted on said secondary shoe adjacent said second ends;
   said cable engaging said cable guide means between said other end of said lever means and said opening in said backing plate.

5. A brake assembly according to claim 4 and including said cable guide means comprising a pulley means rotatably mounted on said secondary brakeshoe.

6. A brake assembly according to claim 4 and including spring means engaging said lever means and biasing said lever toward said primary shoe.